Dec. 21, 1954    R. S. BETTES, JR    2,697,247
WAX HANDLING APPARATUS
Filed March 28, 1952    2 Sheets-Sheet 1

INVENTOR.
Richard S. Bettes, Jr.
BY
ATTORNEY

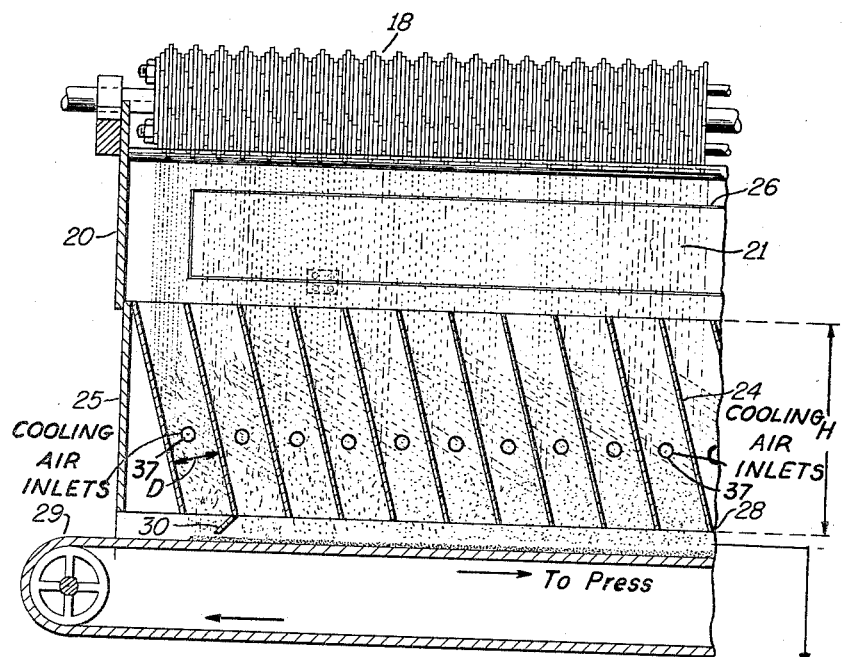
Fig. 2
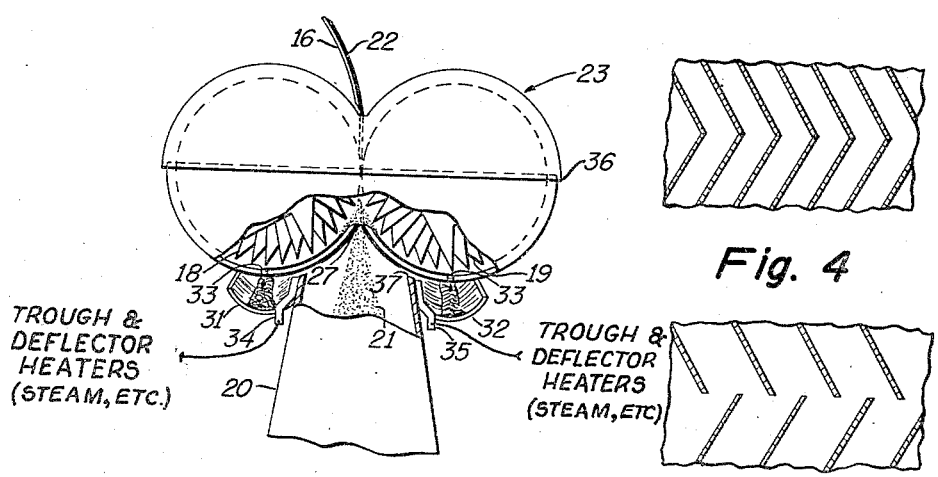
Fig. 3
Fig. 4
Fig. 5
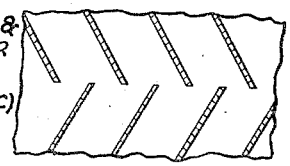

United States Patent Office

2,697,247
Patented Dec. 21, 1954

2,697,247

WAX HANDLING APPARATUS

Richard S. Bettes, Jr., Chicago, Ill., assignor to Standard Oil Company, Chicago, Ill., a corporation of Indiana Application March 28, 1952, Serial No. 279,153

16 Claims. (Cl. 18—1)

This invention relates to improvements in the continuous manufacture of solid wax objects from particulate wax. More particularly it concerns apparatus for handling high velocity adhesive particulate solids whereby such solids may be reduced in velocity and their tendency to agglomerate on a collecting surface a short distance from their source may be substantially eliminated.

A process and apparatus for transforming molten wax into solid cakes or the like which, briefly described, comprises initially forming the wax into a thin plastic film and comminuting same into uniformly particulate solids by means of rapidly rotating intermeshing multi-tooth cutters followed by die compression of the particulate solids into cakes, is described and claimed in copending application for Letters Patent Serial No. 167,216 filed June 9, 1950. In the process therein described, the particulate wax which is formed is projected rapidly downward from the comminuting means and since the wax film is in a semi-solid or plastic state when it is comminuted the particles produced are somewhat tacky and tend to adhere to surfaces which they may strike and to agglomerate thereon. When there is sufficient vertical distance available for the particles to be cooled and substantially decelerated in their downward travel before striking a piece of equipment, e. g. a continuous conveyor leading to the press, agglomeration difficulties are essentially non-existent. The problem of agglomeration is acute, however, when the distance between the comminuting device and the conveyor is so short that the high velocity particles have had little opportunity to be cooled or decelerated and thereby lessen their tendency to agglomerate. It becomes necessary in that event to decelerate the particles in the available space so that the tendency of the adhesive material to agglomerate may be minimized.

Since the delivery of finely divided wax particles to the die forming press in a loose and unpacked condition is essential in the above described process, the present invention has as a primary object the provision of a means whereby the rapidly descending adhesive wax particles may be decelerated to such an extent that they may be received on a continuous conveyor, or the like, positioned only a relatively few inches from the cutters, in the desired condition. It is a further object to provide a means whereby rapidly moving adhesive particles of wax may, in a very short distance, be reduced from a velocity at which agglomeration can not be avoided to one at which substantially no agglomeration occurs. Additional objects will be apparent from the ensuing description when considered in conjunction with the attached drawings.

Briefly stated, the present invention provides a means whereby high velocity adhesive wax particles, produced in the counterrotating cutters of a comminuting device in a manner hereinafter more fully described, may be substantially decelerated by directing same against a plurality of parallel baffles which are displaced from the vertical by a relatively slight angle and are disposed transverse to the axes of the wax comminuting device in such a manner as to intersect the substantially perpendicular wax sprays, causing the wax to impinge thereon and be substantially decelerated. The angle at which the wax strikes the baffles is critical in as much as the further the baffles are dipslaced from the vertical the greater is the likelihood of the particles adhering thereto and causing agglomeration while too slight a displacement from vertical is of little value in decelerating the particles. A second critical requirement is that there be no clear vertical path for wax to travel without striking at least one baffle. Thus, it may be seen that too small an angle of displacement is unsatisfactory for a second reason, viz. the baffles must be too close together in order to prevent wax particles from passing straight through without impingement. It has been found that the baffles should intersect the substantially parallel planar sprays of wax at an angle of from about 5° to about 20°, preferably from about 10° to about 15° and that the distance between parallel baffles should be at least about 1½ inches, preferably at least about 2 inches, and no greater than a distance equal to the vertical height of the baffle arrangement multiplied by the sine of the angle of displacement. The width of the wax sprays entering the baffles is controlled by causing same to pass through a relatively narrow slot immediately upon leaving the cutters. By this means the more widely divergent particles are prevented from passing to the baffles and the remainder is thereby directed in a more uniform pattern. By means of the present invention, therefore, adhesive wax particles descending at the rate of hundreds of inches per second may be decelerated and deposited loosely, without agglomeration, on a surface only a relatively few inches from the comminuting device.

In the accompanying drawings:

Fig. 2 is an enlarged section taken along lines 2—2, with film guide and wax film removed, in Fig. 1 showing the parallel baffles in detail and more clearly indicating the relation of same to the cutters and conveyor.

Fig. 3 is an enlarged detailed view in elevation of the fragment between lines 3—3 in Fig. 1, showing the comminuting device and upper portion of the collecting chute partly in section with elements removed.

Fig. 4 and Fig. 5 are partial views of alternative baffle arrangements showing in section the relation between superimposed sets of baffles.

Figure 1:
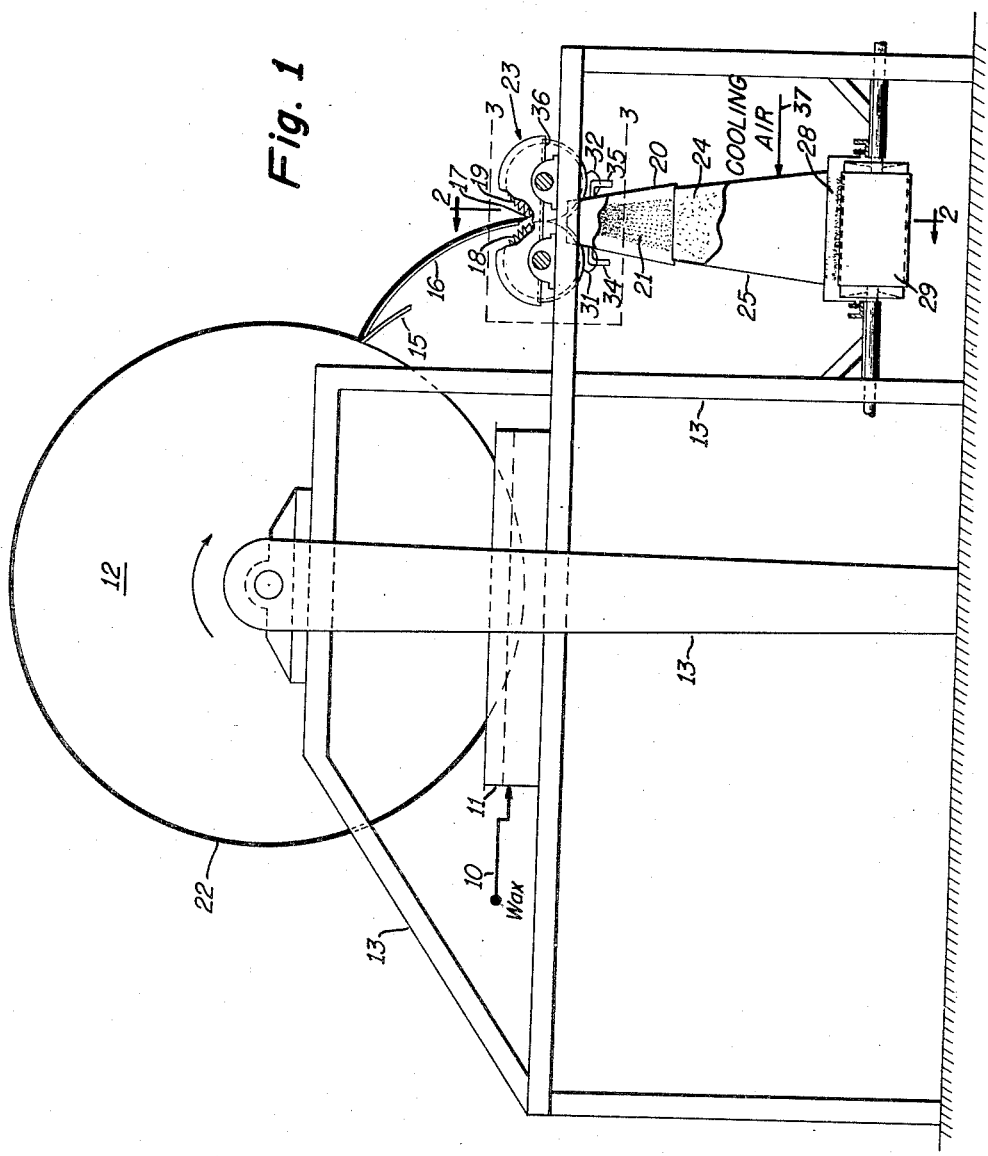
Fig. 1 is a partially diagrammatic elevation of the process for transforming molten wax into particulate solids and then into die compressed solids wherein the relation of the baffle arrangement to the other pieces of equipment is shown.

Referring to Fig. 1 a paraffin wax having a melting point of 122° to 124° F. is introduced at a temperature of from about 25° to 75° above its melting point via line 10 into wax tank 11. It is recommended that the wax be at a temperature sufficiently above its melting point to minimize undesired caking of the wax. The five foot diameter drum 12 having a length of twelve feet is rotatably positioned on supporting structure 13. The drum is rotated at from about 2 to about 10 revolutions per minute (by means not shown) in such a manner as to permit the continuous immersion of a segment of the periphery of the drum in the molten wax. The cooling drum employed in the process is of standard construction and is well-known to the art and while it is preferred to use this means of obtaining a substantially continuous film of plastic wax any other method whereby such a film is produced may be satisfactorily employed. A typical example of the type drum which is suitable for the process is shown in U. S. 1,361,346. In general, all of the mechanical details which are essential to the satisfactory operation of this drum are well-known to the art, hence no detailed description of this apparatus is necessary. It is preferred to direct a continuous spray of coolant against the top of the inside of the drum which results in a continuous falling film of coolant along the drum walls. The coolant is continuously removed from the bottom of the drum by a suction pump (not shown).

As drum 12 is rotated through the molten wax a continuous film of wax 22 is formed on the outer surface of the drum which is at a temperature substantially below the solidification point of the wax. It is preferred that the film coming off of the drum and entering the cutters be within the range of from about 30° to about 40° F. below the melting point of the 122° to 124° F. wax. This temperature range embraces the so-called plastic range of the 122° to 124° F. wax and it is only within that range that the cutters operate efficiently; below about 82° F. the film coming off the drum tends to be brittle while above about 94° F. it is too soft. Whereas the plastic range varies according to the melting point of the wax employed so also does the temperature of the wax film entering the cutters vary with the speed of rotation of the cooling drum, the temperature of the coolant and the rate of introduction of the coolant. As the drum rotates, the wax film 22 is continuously stripped off by scraper blade 15 which is in continuous contact with the outer surface of the rotating drum. The wax film 22 which is stripped from the drum by scraper blade 15 passes over the wax guide 16 cooperatively positioned below the scraper blade in such a manner as to guide the wax film to a point 17 at the intersection of the outer circumferences of the circles formed by the rotation of the teeth on cutters 18 and 19. It is essential that wax guide 16 be at a temperature low enough to prevent sticking of the wax film as it is directed to the cutters. Additional cooling may be obtained by any suitable means such as a stream of cooled air on the underside of the guide or by employing a hollow guide and internally cooling by the same medium that cools the drum 12. The wax film passes into the comminuting device 23 and is comminuted by the rotation of cutters 18 and 19 toward the wax film.

For satisfactory comminution it is essential that the wax film approaching the cutters be within the plastic range yet not too warm. Generally, achieving a film temperature in this range will not be difficult, since with solidification of the wax as the drum turns the wax temperature will fall rapidly to about this temperature. However, should the drum speed be too low or the cooling rate too high the film may be cooled to below about 82° F., become brittle, and as a result break into non-uniform fragments at the scraper blade or in the cutters. On the other hand if these conditions are reversed the film becomes too soft, is not properly comminuted, and tends to foul the cutters. Adjustment of both drum speed and cooling water flow rate are therefore necessary for control of film temperature as well as production capacity.

Throughout the specification and the claims which follow the terms "semi-solid" and "plastic" when referring to the wax film or to the particulate wax solids, shall be understood as being synonomous and as descriptive of paraffin wax or equivalent material which is sufficiently pliable to ride over the scraper blade in a continuous ribbon or film. The temperature range within which a paraffin wax is in this condition is directly related to the melting point of the wax. Thus, a paraffin wax melting at 122° to 124° F. is in this condition at a temperature in the range of from about 30° F. to about 40° F. below its melting point and this range may be readily ascertained for any melting point wax. Within these ranges the normally brittle nature of wax is supplanted by the plastic or semi-solid and it is to the comminution of films of wax or equivalent material in such a condition that this invention is particularly directed.

Counterrotating cutters 18 and 19 in comminuting device 23 cut wax film 22 into adhesive wax particles which are projected rapidly downward in a plurality of perpendicular sprays 21, the planes of which are transverse to the axes of the cutters. The width of these sprays is controlled as the comminuted wax passes through a rectangular slot in the lower housing of comminuting device 23. The wax then passes through chute 20 having a removable panel through which the baffles may be inspected and cleaned. Both the slot and the panel hereinabove referred to are hereinafter more fully described with reference to Fig. 2 and Fig. 3. The parallel baffles 24 in housing 25, which is cooperatively affixed to chute 20, are positioned at an angle of 15° from the vertical and intersect the planes of the wax sprays, causing the particles to impinge thereon and be substantially decelerated. The wax leaves the baffle arrangement at 28 and falls freely a short distance to the conveyor 29 which delivers the wax to the press.

It is desirable that there be sufficient space between the cutters and baffles to permit cleaning of the equipment without dismantling same. If, however, space is extremely limited, chute 20 can be shortened and the baffles brought up quite close to the base of the housing around comminuting device 23. The baffles should not be positioned too close to the housing or the wax troughs 31 and 32, hereinafter described in detail, however, in order to avoid raising the temperature of the baffles much above 70° F. For proper operation, the baffles should be substantially cooler than the descending wax particles. Thus, unless substantial quantities of cooled air can be passed around baffles 24 to prevent their increasing in temperature, the top of the baffles 24 should be at least a sufficient distance from troughs 31 and 32 to prevent any heating of this kind. The top of the housing on comminuter 23 separates from the bottom at 36 for ease of maintenance.

Fig. 2 more clearly depicts the manner in which the substantially perpendicular planar sprays of wax 21 are intersected by baffles 24 causing the sprays to be broken and the particles to be deflected and decelerated. Some of the wax will be deflected to the opposing baffle after the initial impingement and will strike opposing baffles a number of times before leaving the baffle arrangement at 28 and being received on conveyor 29. It is advantageous to employ a reverse baffle at the ends of each baffle in a manner similar to that indicated, with respect to a single baffle, by 30. Whereas baffle 30 is shown very short in length relative to the main baffles 24 it may, space permitting, be substantially longer with a definite advantage being gained thereby. Thus, for example, superimposed baffle arrangements may be used wherein an uppermost set of baffles is displaced to one side of the vertical and a lower set in which the baffles are displaced to the opposing side as shown in Fig. 4 and Fig. 5 or the baffles may be displaced to same side of vertical and staggered in a manner analogous to Fig. 5. The angle at which the lower set is displaced may be different than that of the upper set.

The angle at which baffles 24 are displaced from vertical may vary within narrow limits but should be no greater than about 20° from the vertical and should be positioned in such a manner, with respect to juxtaposed parallel baffles, that no clear vertical path through the baffle system is open to the wax particles, i. e. the maximum distance D permissable between baffles is equal to the vertical distance H, from top to bottom of the baffles, multiplied by the sine of the angle of displacement. It is preferred that this distance D be at a maximum but it may be reduced if desired. When superimposed baffle arrangements are employed as shown in Fig. 5 D can exceed H times the sine of the angle if the lower set of baffles is positioned so that no particle can pass directly through without contacting at least one baffle. There should, however, be at least about 1½ inches between baffles in order to avoid packing and clogging of wax particles. These two features of the baffle arrangement viz., angle of displacement and distance between baffles, are critical and have the effect of fixing a minimum value for H. Since a primary object of the present invention is to prevent agglomeration of adhesive particulate wax on the conveyor when the distance between cutters and conveyor is insufficient for the particles to slow down and/or be cooled, it may be seen that there exists a practical maximum value for H viz., the minimum distance in which the projected wax will decelerate and/or cool sufficiently to prevent agglomeration in the absence of any decelerating means. The present invention is particularly adapted for use in those situations wherein a distance of less than about five feet exists between cutters and conveyor or other surface and the adhesive wax is projected from the cutters at velocities in excess of about 600 inches per second. Employing a system of baffles wherein H was 10.5 inches and D was 1.96 inches particles leaving the cutters at about 1230 inches per second have been decelerated and received on a conveyor less than 2 feet from the cutter in a loose and non-agglomerated condition. Chute 20 in such case was about 10 inches.

Baffles 24 and housing 25 may be produced from metal or synthetic resin or the like and although their thickness may vary within reasonable limits they should be as thin as possible so as to permit a maximum of baffles to be placed under the cutter. The use of the resin Teflon (polytetrafluoroethylene) for this purpose has definite advantages in view of the fact that wax has somewhat less tendency to adhere thereto than to other resins or metals. Panel 26 in chute 20 may be opened to inspect and clean the baffle and to observe the manner in which the wax impinges on baffles 24.

Cutters 18 and 19 have a diameter of 8 inches and when they are rotating at 3,000 R. P. M. the teeth about their peripheries will have a velocity of about 1230 inches per second. Whereas the wax particles are projected from the cutters at somewhat less than this velocity because of air resistance, etc., they are nevertheless traveling at a velocity close to this figure. By means of the present invention therefore it is possible to decelerate wax particles, in a short distance, from a velocity at which upon striking the conveyor agglomeration could not be avoided to a velocity at which substantially no agglomeration occurs.

Referring now to Fig. 3 it may be seen that as wax particles 21 are projected rapidly from cutters 18 and 19, those which can, pass through slot 27 formed by the leading edges of the housing of comminuter device 23. The angle of these sprays can thus be controlled so that more widely divergent particles can be caught on the leading edges of slot 27. These leading edges are heated so that wax impinged thereon is melted and permitted to leave the housing through a plurality of apertures 33 bored longitudinally in the lowermost portion of the housing or to run along the underside of the housing. The molten wax flowing along the underside of the housing and through apertures 37 or through apertures 33 enters troughs 31 and 32 and from there empties into a tank (not shown). The leading edges and base of the comminuter housing and troughs 31 and 32 may be heated by any suitable means, e. g. by affixing steam or hot water lines as diagrammatically indicated by 34 and 35 in a manner apparent to one skilled in the art and providing for appropriate return lines, etc. (not shown). Troughs 31 and 32 and the leading edges of the housing may be hollow if desired and the heating medium passed therein.

Conveyor 29 is positioned directly below baffles 24 allowing sufficient space to permit the pile of wax particles to travel thereunder without contact.

Comminuting device 23 is described in detail and claimed in my copending application for Letters Patent Serial No. 186,805, filed June 9, 1950. As can be seen from Figs. 1, 2 and 3, comminuting device 23 comprises essentially a pair of counterrotating intermeshing cutters 18 and 19 each of which has a plurality of teeth about its periphery. In a preferred embodiment the cutters have 36 equally spaced rows of very thin teeth about each 8 inch cutter and the cutters intermesh a distance at least equal to the thickness of the wax film and coact without contact between cutters to cut the film of wax into uniformly particulate solids.

The degree of particulation necessary for process operation is primarily limited by the design of the press. Most presses suitable for an operation of this type require that the bulk ratio of the material being pressed be less than 3½. The bulk ratio of particulate material is that figure which represents the ratio of a volume of unpressed wax to the volume of a solid cake produced from the unpressed wax. Since the volume of particulate wax will vary with settling, two volume measurements are ordinarily made on the unpressed wax: One immediately after pouring into a measuring vessel, the other after forced settling caused by light tapping on the vessel has ceased. In Table I below, the maximum figures relate to the volume measurement taken immediately and the minimum is that after light tapping. From this table can be seen to what extent the film of plastic wax is comminuted by cutters 18 and 19.

TABLE I

*Bulk ratios of samples of granulated paraffin wax*

| Cutter Speed, R. P. M. | Drum Speed, R. P. M. | Bulk Ratio | |
|---|---|---|---|
| | | Max. | Min. |
| 2,080 | 4½ | 4.0 | 3.0 |
| 2,760 | 4½ | 3.3 | 2.5 |
| 3,100 | 4½ | 3.0 | 2.4 |
| 4,450 | 4½ | 2.9 | 2.6 |

To aid in the prevention of agglomeration of the adhesive wax particles leaving the cutters it is highly desirable that cooled air, introduced via inlets 37, be passed upward through chute 20 and the baffles 24 to cool the baffles and the downcoming wax as much as possible.

It shall be understood that various changes and modifications may be made in the novel apparatus of the present invention without departing from the spirit thereof and while the apparatus has been described specifically with respect to paraffin wax it is adaptable for other waxes both natural and synthetic as well as such materials as soaps, detergents, etc.

I claim:

1. An apparatus for handling adhesive particles at a temperature slightly below the melting point of said particles which apparatus comprises a means for projecting said adhesive particles in a plurality of substantially parallel fan-shaped sprays, a plurality of parallel baffles disposed in the path of said particles intersecting said sprays at an angle in the range of from about 5° to about 20° and spaced from each other by at least about 1½ inches and not greater than a distance corresponding to the height of the baffles multiplied by the sine of said angle, and deflecting surfaces between said projecting means and said baffles for limiting the width of the fan-shaped sprays.

2. The apparatus of claim 1 which includes means for heating said deflecting surfaces above the melting point of the particles so that deflected particles may be removed from the deflecting surfaces as a liquid.

3. The apparatus of claim 1 which includes means for contacting said baffles and adhesive particles with a cooling gas.

4. Apparatus for processing a material which passes through a plastic state while being transformed from liquid to solid, which apparatus comprises in combination means for producing a continuous film of said material in the plastic state, means for comminuting said continuous film while in the plastic state and projecting the adhesive comminuted product downward at a velocity of at least about 600 inches per second in a plurality of substantially parallel vertical planar sprays said comminuting means comprising counterrotatable, intermeshing multitooth cutters, means for guiding said film of wax to said comminuting means from said means for producing the plastic film, means for receiving said comminuted product and transporting same to a die forming press, means disposed between said comminuting means and said receiving means for decelerating the high velocity comminuted product and preventing agglomeration thereof upon striking said receiving and transporting means which decelerating means comprises a plurality of parallel baffles displaced at an angle of from about 5° to about 20° from vertical, each of said baffles being separated from those juxtaposed thereto by a distance D in the range of from about 1½ inches to that distance obtained by multiplying the sine of the angle at which the baffles are displaced from vertical by the vertical distance H from top to bottom of said baffles, said baffles being so disposed below said comminuting means that said planar sprays strike said baffles at about the angle at which the baffles are displaced from vertical and means for pressing regulated quantities of said comminuted product into uniform solid objects.

5. The apparatus of claim 4 which includes means disposed between said projecting means and said decelerating means for regularizing the width of said sprays to conform to the width of the baffles by eliminating divergent particles therefrom.

6. The apparatus of claim 5 wherein the regularizing means includes means for heating same above the melting point of the particles eliminated thereby so that the same may be removed therefrom as a liquid.

7. In combination with a comminuting device comprising two counterrotatable intermeshing multi-tooth cutters whereby a film of semi-solid wax may be transformed into adhesive wax particles which are projected therefrom in a plurality of substantially parallel vertical planar sprays at a velocity sufficient to cause agglomeration thereof upon striking a conveyor disposed therebelow, a decelerating means disposed below said comminuting means which comprises a plurality of parallel baffles displaced at an angle of from 5° to about 20° from vertical, each of said baffles being separated from those juxtaposed thereto by a distance D in the range of from about 1½ inches to that distance obtained by multiplying the sine of the angle at which the baffles are displaced from vertical by the vertical distance H from top to bottom of said baffles, said baffles being so disposed below said comminuting means that substantially all of the wax particles in said planar sprays strike the baffles at about the angle at which the baffles are displaced from vertical and a conveyor disposed below said decelerating means for receiving said wax particles and transporting same to a die forming press.

8. In combination with means for projecting particulate solids of an adhesive nature in a plurality of substantially parallel planar sprays said solids being projected at a velocity sufficient to cause agglomeration thereof upon striking a collecting surface in their path, a means for decelerating said solids and substantially preventing their agglomeration disposed between said projecting means and said collecting surface which decelerating means comprises a plurality of parallel baffles displaced at an angle of from about 5° to about 20° from vertical, each of said baffles being separated from those juxtaposed thereto by a distance D in the range of from about 1½ inches to that distance obtained by multiplying the sine of the angle at which the baffles are displaced from vertical by the vertical distance H from top to bottom of said baffles, said baffles being so disposed below said projecting means that said baffles intersect the path of said planar sprays at about the angle at which the baffles are displaced from vertical.

9. The combination of claim 8 which includes means for contacting the wax particles and baffles with a cooling gas.

10. In combination with means for rapidly projecting adhesive particulate solids downward in a plurality of substantially parallel vertical planar sprays, a means for regularizing the width of said sprays, disposed below said projecting means, which comprises a barrier means having a substantially rectangular opening therein positioned substantially immediately below and parallel to the source of said sprays whereby divergent particulate solids may be eliminated from said sprays and means for decelerating said solids and substantially preventing their agglomeration on a substantially horizontal surface in their path disposed between said projecting means and said surface which decelerating means comprises a plurality of parallel baffles displaced at an angle of from about 5° to about 20° from vertical, each of said baffles being separated from those juxtaposed thereto by a distance D in the range of from about 1½ inches to that distance obtained by multiplying the sine of the angle at which the baffles are displaced from vertical by the vertical distance H from top to bottom of said baffles, said baffles being so disposed below said projecting means that substantially all of the wax particles in said planar sprays strike said baffles at about the angle at which the baffles are displaced from vertical.

11. The combination of claim 10 wherein the barrier means includes means for heating same so that the particulate solids which have been eliminated from the sprays may be melted and removed therefrom as a liquid.

12. The combination of claim 10 which includes a second set of parallel baffles cooperatively disposed below said plurality of parallel baffles of said decelerating means wherein the baffles in said second set are displaced, with respect to vertical, to the opposite side from those baffles in said decelerating means and coact with the baffles in said decelerating means to additionally decelerate the adhesive particles.

13. The combination of claim 12 wherein said second set of baffles is attached to and forms an extension of the parallel baffles thereabove.

14. An apparatus for handling adhesive particles at a temperature slightly below the melting point of said particles, which apparatus comprises means for projecting said adhesive particles downward in a plurality of substantially parallel fan-shaped vertical sprays, a first set of parallel baffles disposed in the path of said particles intersecting said sprays at an angle in the range of from about 5° to about 20° said baffles being separated from each other by at least about 1½ inches, a second set of parallel baffles cooperatively disposed below said first set of baffles in which second set the baffles are displaced to the opposite side of vertical from the baffles in said first set and said first and second set of baffles coact to prevent any of said particles from passing through said baffles without contacting same.

15. The apparatus of claim 14 wherein the said second set of baffles is attached to and forms an extension of the first set of baffles.

16. An apparatus for handling adhesive particles at a temperature slightly below the melting point of said particles, which apparatus comprises means for projecting said adhesive particles downward in a plurality of substantially parallel fan-shaped vertical sprays, a first set of parallel baffles disposed in the path of said particles intersecting said sprays at an angle in the range of from about 5° to about 20° said baffles being separated from each other by at least about 1½ inches, a second set of parallel baffles cooperatively disposed below said first set of baffles which coact with said first set to prevent any of said particles from passing through said baffles without contacting same.

References Cited in the file of this patent

UNITED STATES PATENTS

| Number | Name | Date |
|---|---|---|
| 1,814,172 | Martinet | July 14, 1931 |
| 1,845,847 | Reuther | Feb. 16, 1932 |
| 2,245,640 | Beattie | June 17, 1941 |
| 2,516,295 | Borton et al. | July 25, 1950 |